March 10, 1953 B. E. SHAW 2,631,247

PHOTOCELL MOUNTING DEVICE

Filed Sept. 17, 1949

Inventor
BURTON E. SHAW
By M C Metcalf
Attorney

Patented Mar. 10, 1953

2,631,247

UNITED STATES PATENT OFFICE 2,631,247

PHOTOCELL MOUNTING DEVICE

Burton E. Shaw, East Boxford, Mass., assignor to Photoswitch, Incorporated, Cambridge, Mass., a corporation of Massachusetts Application September 17, 1949, Serial No. 116,393

4 Claims. (Cl. 250—239)

This invention relates to devices for mounting and testing radiation-sensitive elements such as photoelectric cells.

In many types of photoelectric controls, provision must be made for periodically checking the operation of the detecting photocell under certain standard test conditions. A fixed spatial relationship between the cell and the test light source is one of the requirements. In most operating installations compactness, simplicity of mounting, and protection of the cell from dirt, dampness, vibrations, and mechanical shock are also important considerations.

The object of the invention is to provide a self-contained, compact and inexpensive mounting and test fixture which is suitable for checking and testing the operation of the cell under known conditions, which insures maximum life of the cell by cushioning and protecting it against mechanical damage, which minimized stresses due to unequal thermal expansion of the various members, and which allows for selection of the frequency and direction of radiation to which the cell is exposed.

The mounting device here described is suitable both for comparative testing of different cells, and for periodic testing of a particular cell, either as an experimental fixture or as a permanent operating installation.

These and other objects, improvements and novel features of this device will be more apparent from the following detailed description:

In the accompanying drawings.

Figure 1:
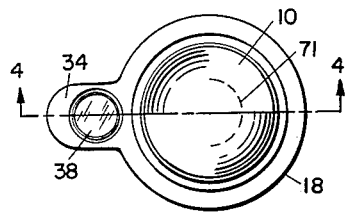
Fig. 1 is a plan view of the mounting device.
Figure 4:
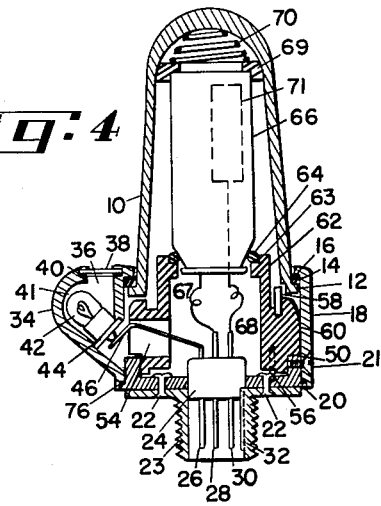
Fig. 4 is a cross-section along line 4—4 of Fig. 1.
Figure 2:
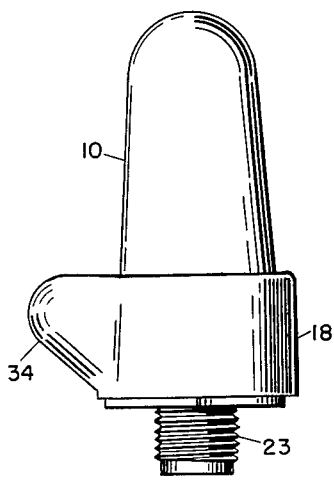
Fig. 2 is a side elevation.

The mounting device consists generally of a filter shield, secured to a base which houses an insulating support for the photoelectric cell and a multiple connector of conventional type for external wiring, a mounting for an electric light bulb near an aperture in the base in fixed relation to the cell, and suitable resilient cushioning members at the contact points between the cell and the housing.

As shown particularly in Figures 1, 2, 3, and 4, the photocell 66 is housed in a dome shaped shield 10 made of suitable material such as glass or plastic. The shield may be made of filter glass adapted to transmit only a selected band of frequencies of radiation, for example, infrared, and terminates at the bottom in an outwardly projecting flange 12. A generally cylindrical housing base 18, preferably of cast aluminum, is fitted at the bottom with a flanged connector plate 20 fastened in place by screws 21. A threaded fitting 23 for mounting the device is fastened to plate 20 by rivets 22 and carries a tripole connector 24 of conventional type with terminals 26, 28, 30 properly aligned. The connector is fixed against rotation in fitting 23 by the bead 32.

A projection 34, which is cast as an integral part of the housing base 18, is internally recessed and has an opening 36 in its upper face. The opening is covered by test window 38, which is cushioned against a metal shoulder by a rubber ring 40 and fastened in place, preferably, by spinning over the surrounding rim.

The opening 36 communicates with the recess 41, which houses test lamp 42, so inclined as to shine on the shield 10. The base rim 44 of the test lamp is electrically grounded. The lamp is held in place against a shoulder in the recess 41 by an electrically conductive leaf spring 46 which also serves as the electrical contact with the center terminal of the test lamp. The lower end of leaf spring 46 is connected to the tripole terminal 26.

Figure 5:
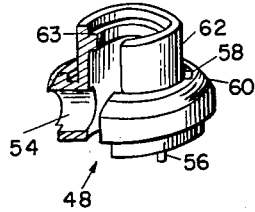
Fig. 5 is an isometric view, partially in section, of the insulating base member.

The housing base 18 contains an annular insulating base block 48 (Figs. 4 and 5), which is shouldered top and bottom to form a flange 60. The lower rim of the block fits over flange 50 of connector plate 20. A clearance hole in the block 54 accommodates the leaf spring 46. A locating pin 56 is fixed to the lower surface of the block and engages a locating recess in connector plate 20. Another pin 58 on the upper side of the flange 60 engages a locating notch in the bottom flange of the shield 10 to prevent relative rotation of the members. The reduced neck portion 62 carries an internal shoulder 63 which holds a washer 64, of resilient material, such as rubber, for cushioning and supporting the photocell 66. Terminals 67 and 68 of the photocell are connected to terminals 28 and 30 of the tripole connector, preferably by soldering in the case of a permanent installation. Enough slack is left in wires 67 and 68 to permit assembly of the members.

The upper end of the cell 66 is held in a recessed washer 69, of rubber or other resilient material, against the inner wall of the shield 10. A coil spring 70 compressed against the upper surface of the washer 68 and the top of shield 10, provides the pressure to keep the photocell 66 firmly seated between washers 64 and 69, and to hold the flange 12 of shield 10 against the gasket 14 which is retained by inner shoulder 16 of the base 18. This resilient mounting of the photocell and shield minimizes the stresses imposed on the fragile parts by vibration, mechanical shock, and temperature changes.

Figure 7:
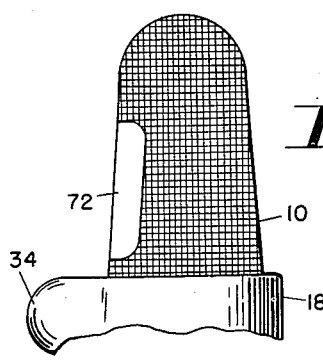
Fig. 7 is a partial view of the device showing an alternative construction of the filter shield.
Figure 3:
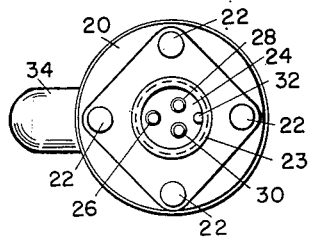
Fig. 3 is a bottom view.

The photoelectric cell is positioned in the housing so that its radiation-sensitive element 71 faces the test window 38. While the arrangement of the element 71 gives the cell a directional characteristic, the field of observation of the cell may be further restricted by painting or covering on the filter shield 10, except for a window 72, as shown in Fig. 7.

Figure 6:
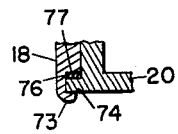
Fig. 6 is an enlarged view showing an alternate construction for holding the connector plate to the housing.

The connector plate 20 may be fastened to the housing base 18 as shown in Fig. 6 by spinning over the bottom rim of base 18. A gasket 76 is inserted between the flange 74 and the shoulder 77 to insure a tight seal.

Since certain changes may be made in the above-described article and different embodiments of the invention could be made without departing from the scope thereof, it is intended that all matter contained in the above description or shown in the accompanying drawing shall be interpreted as illustrative only and not in a limiting sense.

What is claimed is:

1. A mounting device for photocells, which comprises: a hollow housing base carrying an inward projecting flange; a shield having an outward projecting flange arranged to engage the flange on said base; means for maintaining said flanges in engagement; a photocell support mounted within said housing; and a projection in one side of said housing base, said projection providing means for mounting a radiant energy emitting element in fixed relationship to a photocell mounted on said support.

2. A device according to claim 1 having a multipole connector fastened in said housing base so as to provide electrical connections for said photocell and said radiant energy emitting element.

3. A mounting device for photocells, which comprises: a hollow housing base carrying an inward projecting flange; a dome-shaped shield having on its lower edge an outward projecting flange adapted to engage the flange on said base; a photocell mounted within said housing; a spring compressed between the end of said cell and said shield so as to maintain said cell, said shield, and said base in engagement; and a projection in the side of said housing base, said projection being internally formed to provide a means for mounting an electric light bulb and having an opening in the direction of the sensitive element of said photocell.

4. A device according to claim 3 having a multipole connector fixed to said base, and having a leaf spring attached to one of the contacts of said connector adapted to engage one of the external contacts of said bulb.

BURTON E. SHAW.

REFERENCES CITED

The following references are of record in the file of this patent:

UNITED STATES PATENTS

| Number | Name | Date |
|---|---|---|
| 1,116,048 | Farber | Nov. 3, 1914 |
| 2,013,095 | Friend | Sept. 3, 1935 |
| 2,169,818 | Scott | Aug. 15, 1939 |
| 2,337,401 | Miller | Dec. 21, 1943 |
| 2,458,048 | Bauman | Jan. 4, 1949 |

FOREIGN PATENTS

| Number | Country | Date |
|---|---|---|
| 773,398 | France | Sept. 3, 1934 |